United States Patent [19]
Davis et al.

[11] 4,321,342
[45] Mar. 23, 1982

[54] CURABLE FIXTURES OF POLYEPOXIDES AND AMINE-TERMINATED GRAFT POLYMER DISPERSIONS

[75] Inventors: John E. Davis, Woodhaven; Moses Cenker, Trenton, both of Mich.

[73] Assignee: BASF Wyandotte Corporation, Wyandotte, Mich.

[21] Appl. No.: 238,756

[22] Filed: Feb. 27, 1981

[51] Int. Cl.³ .................................................. C08L 63/00
[52] U.S. Cl. ........................................ 525/530; 525/438; 525/455; 525/529; 525/532
[58] Field of Search ............... 525/529, 530, 532, 438, 525/455

[56] References Cited

U.S. PATENT DOCUMENTS

| | | | |
|---|---|---|---|
| Re. 29,118 | 1/1977 | Stamberger | 525/309 |
| 3,383,351 | 5/1968 | Stamberger | 521/137 |
| 3,436,359 | 4/1969 | Hubin | 525/410 |
| 3,524,902 | 8/1970 | Feltzin | 525/532 |
| 4,018,851 | 4/1977 | Baccei | 525/529 |
| 4,161,468 | 7/1979 | Davis | 525/529 |

*Primary Examiner*—Paul Lieberman
*Attorney, Agent, or Firm*—Norbert M. Lisicki

[57] ABSTRACT

Curable mixtures of polyepoxides and amine-terminated polymers are employed. The amine-terminated polymers are prepared by the in situ free radical polymerization of ethylenically unsaturated monomer or monomers in amine-terminated polyoxyalkylene polyether polymers.

9 Claims, No Drawings

CURABLE FIXTURES OF POLYEPOXIDES AND AMINE-TERMINATED GRAFT POLYMER DISPERSIONS

BACKGROUND OF THE INVENTION

1. Field of the Invention

The present invention relates to curable mixtures of amine-terminated stable graft polymer dispersions of high monomer conversion and cured polyepoxide compounds. More particularly, the invention relates to curable mixtures of polyepoxide compounds and graft polymer dispersions prepared by the process of employing in situ free radical polymerization of ethylenically unsaturated monomer or monomers in amine-terminated polyoxyalkylene polyether polymers.

2. Description of the Prior Art

The prior art teaches the preparation of epoxy resin products by the reaction of compounds containing epoxide groups and amines, anhydrides, phenols, mercaptans and alcohols. The most common is the resin prepared from the epoxide and an amine. Fillers have also been well known in the art. U.S. Pat. No. 3,510,444 teaches the use of siliceous reinforcing fillers. U.S. Pat. No. 3,480,695 teaches the use of polyhydroxyether-polycarbonate mixtures. None of the prior art teaches or suggests the use of the amine-terminated polyoxyalkylene polyether polymers of the instant invention reacted with polyepoxide compounds.

SUMMARY OF THE INVENTION

The present invention relates to curable mixtures of polyepoxide compounds and graft polymer dispersions which are prepared by the in situ polymerization in the presence of a free radical initiator, of an ethylenically unsaturated monomer or a mixture of monomers, in an amine-terminated polyoxyalkylene polyether polymer.

DESCRIPTION OF THE PREFERRED EMBODIMENTS

In accordance with the present invention, stable graft polymer dispersions which are prepared by the in situ free radical polymerization of an ethylenically unsaturated monomer or mixtures of said monomers in an amine-terminated polyoxyalkylene polyether polymer are employed with polyepoxide compounds.

The amine-terminated polyoxyalkylene polyether polymer may be prepared by procedures well known to those skilled in the art. One possible route is the conversion of the terminal hydroxyl groups of a polyoxyalkylene polyether polyol to amine groups by reaction with acrylonitrile and subsequent reduction to an amine-terminated polyoxyalkylene polyether polymer. The amine-terminated polyoxyalkylene polyether polymer may or may not contain any unsaturation within the molecule.

The polyols which may be employed in the present invention for the preparation of the amine-terminated polyoxyalkylene polyether polymers are well known in the art. Both conventional polyols essentially free from ethylenic unsaturation such as those described in U.S. Pat. No. Re. 28,715 and unsaturated polyols such as those described in U.S. Pat. No. 3,652,659 and U.S. Pat. No. Re. 29,014 may be employed in the invention. Representative polyols essentially free from ethylenic unsaturation which may be employed in the present invention are well known in the art. They are often prepared by the catalytic condensation of an alkylene oxide or a mixture of alkylene oxides either simultaneously or sequentially with an organic compound having at least two active hydrogen atoms such as evidenced by U.S. Pat. Nos. 1,922,459; 3,190,927, and 3,346,557.

Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used. Generally, the equivalent weight of the polyols will vary from 100 to 5000, preferably from 125 to 3000.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, sorbitol and sucrose. Also included within the term "polyhydric alcohol" are compounds derived from phenol such as 2,2'-bis(4,4'-hydroxyphenyl)-propane, commonly known as Bisphenol A.

Any suitable polyoxyalkylene polyether polyol may be used such as the polymerization product of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Those preferred include the alkylene oxide addition products of trimethylolpropane, glycerine, pentaerythritol, sucrose, sorbitol, propylene glycol, and 2,2'-(4,4'-hydroxyphenyl)-propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,3-propanedithiol, and 1,6-hexanedithiol; alkenethiols such as 2-butene-1,4-dithiol; and alkynethiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylenedianiline, the condensation products of aniline and formaldehyde, and 2,4-diaminotoluene; aliphatic amines such as methylamine, triisopropanolamine, ethylenediamine, 1,3-diaminopropane, 1,3-diaminobutane, and 1,4-diaminobutane.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The unsaturated polyols which may be employed for preparation of graft copolymer dispersions may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene-3,4-epoxide, butadiene monoxide, vinyl glycidyl ether(1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkylene oxide, preferably ethylene or propylene oxide, to replace the terminal or free carboxyl groups with hydroxyl groups prior to employment in the present invention. The amount of alkylene oxide employed is such to reduce the acid number of the unsaturated polyol to about one or less.

To prepare the unsaturated polyols for use in the present invention, from about 0.05 mole to about 3.0 moles, preferably from 0.30 mole to 1.50 moles, of said organic compound per mole of polyol are employed. The preparation of the unsaturated polyols employed in the present invention follows conventional prior art procedures such as disclosed in U.S. Pat. No. 3,275,606 and U.S. Pat. No. 3,280,077. Generally, this requires a reaction at a temperature between 0° C. and 130° C. Both acidic catalysts, such as Lewis acid catalysts and basic catalysts such as alkali metal hydroxides, may be used. In addition, a noncatalyzed reaction may be used employing temperatures between 50° C. and 200° C.

As mentioned above, the graft polymer dispersions used in the invention are prepared by the in situ free radical polymerization, in the amine-terminated polyoxyalkylene polyether polymers of an ethylenically unsaturated monomer or a mixture of ethylenically unsaturated monomers. Representative ethylenically unsaturated monomers which may be employed in the present invention include butadiene, isoprene, 1,4-pentadiene, 1,5-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl-4-vinylbenzoate, phenoxystyrene, p-vinyldiphenyl sulfide, p-vinyldiphenyl oxide, and the like; the acrylic and substituted acrylic monomers such as acrylonitrile, acrylic acid, methacrylic acid, methyacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, 2-ethylhexyl acrylate, phenyl acrylate, phenyl methacrylate, α-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl chloroacetate, vinyl butyrate, isopropenyl acetate, vinyl formate, vinyl acrylate, vinyl methacrylate, vinyl methoxyacetate, vinyl benzoate, vinyl iodide, vinylnaphthalene, vinyl bromide, vinyl fluoride, vinylidene bromide, 1-chloro-1-fluoroethylene, vinylidene fluoride, vinyl methyl ether, vinyl ethyl ether, vinyl propyl ether, vinyl butyl ether, vinyl 2-methoxyethyl ether, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl phosphonates such as bis($\beta$-chloroethyl)vinylphosphonate, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention. Preferably, the monomer is selected from the group consisting of acrylonitrile, styrene and mixtures thereof.

The amount of ethylenically unsaturated monomer employed in the polymerization reaction is generally from one percent to 75 percent, preferably from 15 percent to 60 percent, based on the total weight of the dispersion product. The polymerization occurs at a temperature between about 80° C. and 170° C., preferably from 85° C. to 135° C.

Illustrative initiators which may be employed are the well-known free radical types of vinyl polymerization initiators, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-$\sim$-cumyl peroxide, dipropyl peroxide, diisopropyl peroxide, isopropyl-t-butyl peroxide, butyl-t-butyl peroxide, dilauroyl peroxide, difuroyl peroxide, bis(p-methoxybenzoyl) peroxide, p-monoethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, $\sim$-methylbenzyl hydroperoxide, $\alpha$-methyl-$\alpha$-ethyl benzyl hydroperoxide, tetralin hydroperoxide, triphenylmethyl hydroperoxide, diphenylmethyl hydroperoxide, $\alpha$-$\alpha'$-azo-bis(2-methylbutyronitrile), $\alpha,\alpha'$-azobis(2-methylheptonitrile), 1,1'-azobis(1-cyclohexane carbonitrile), dimethyl $\alpha,\alpha'$-azobis(isobutyrate), 4,4'-azobis(4-cyanopentanoic acid), azobis(isobutyronitrile), 1-t-amylazo-1-cyanocyclohexane, 2-t-butylazo-2-cyanobutane, persuccinic acid, diisopropyl peroxydicarbonate, and the like; a mixture of catalysts may also be used. Azobis(isobutyronitrile) and 2-t-butylazo-2-cyanobutane are the preferred catalysts. Generally, from about 0.5 percent to about 10 percent, preferably from about 1 percent to about 4 percent, by weight of catalyst based on the weight of the monomer will be employed in the final polymerization.

The epoxide compounds contemplated herein have a 1,2-epoxy equivalent greater than 1.0 and range in molecular weight from about 150 to about 5000.

One of the preferred class of polyepoxides are the polyglycidyl ethers of polyphenols, such as bisphenol A. They have the general structure as follows:

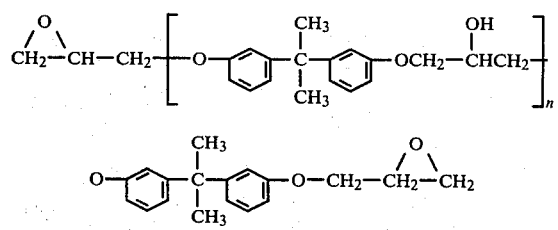

wherein n ranges from 0 to 25.

Other polyglycidyl ethers of polyhydric compounds may be employed. These include the polyglycidyl ethers of ethylene glycol, diethylene glycol, triethylene glycol, 1,2-propanediol, 1,4-butanediol, 1,5-pentanediol, 1,2,6-hexanetriol, glycerol, trimethylolpropane, trimethylolethane, and methylglucoside, pentaerythritol and sorbitol. Also included are the polyglycidyl ethers of alkylene oxide adducts of these polyhydric compounds. The alkylene oxides which may be employed are ethylene oxide, propylene oxide and butylene oxide. The equivalent weights of these compounds including the oxyalkylated products may range from 87 to 2500.

Cycloaliphatic diepoxides may be employed. These include compounds having the following formulas:

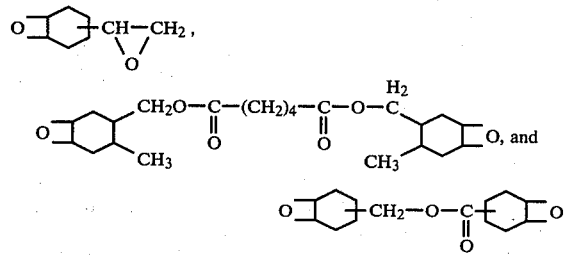

Ortho cresol formaldehyde polyepoxides may be employed. These have the formula:

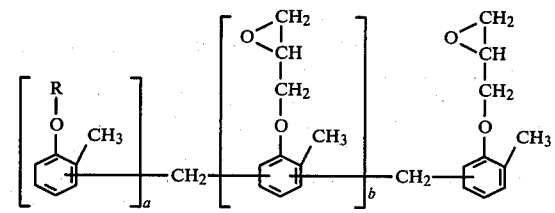

wherein a and b are integers from 1 to 3 and R is selected from the group consisting of

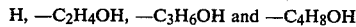

H, —$C_2H_4OH$, —$C_3H_6OH$ and —$C_4H_8OH$

Additionally resorcinol diglycidyl ether may be employed.

The amine polymers and the polyepoxide compounds are reacted at ratios of amine equivalent to epoxy equivalent from about 0.9 to 1.0 to 1.1 to 1.0, preferably from about 0.95 to 1.0 to 1.05 to 1.0.

The curable compositions disclosed herein may contain other optional additives such as pigment, fillers, antioxidants, surfactants, etc. Various catalysts known to accelerate the amine epoxide reaction may also be employed. These compositions may be employed as surface coatings, bonding and adhesives, castings, moldings, and potting compounds.

The compositions may be prepared at temperatures ranging from 20° C. to 150° C. The time required for polymerization varies inversely with the temperature and may range from 10 minutes to 24 hours depending upon the expected use.

The use of the compositions of this invention can result in less expensive curable epoxy resin compositions wherein lesser quantities of polyepoxy compounds may be required without substantial loss of desirable physical properties.

The following examples illustrate the nature of the invention. All parts are by weight unless otherwise stated. In the examples, the physical properties of the cured polymers were determined by the following ASTM tests:

| Tensile Strength | D-412 |
|---|---|
| Elongation | D-412 |
| Shore "A" Hardness | D-2240 |
| Shore "D" Hardness | D-2240 |

In these examples, the composition of the polymers as designated by the letters A and B are as follows:

Polymer A is a primary amino group-terminated polyoxypropylene polyether polymer having an equivalent weight of 500.

Polymer B is a primary amino group-terminated propylene oxide adduct of trimethylolpropane having an equivalent weight of 67.

EXAMPLE 1

A one-liter reaction flask, equipped with a stirrer, thermometer, water-cooled reflux condenser, nitrogen inlet and 2 precision laboratory pumps for metering the monomer mixture and the catalyst/diamine mixture, was charged with 215.8 parts of Polymer A. After flushing the reactor well with nitrogen, a steady and continuous addition of a mixture of 40.6 parts of styrene and 40.6 parts of acrylonitrile in one stream and a suspension of 1.63 parts of 2,2'-azobis(isobutyronitrile) in 109.2 parts of Polymer A in a second stream was made to the reactor maintained at 124°-125° C. The monomer stream was added over a period of 120 minutes to the reactor while the catalyst/diamine stream was added concurrently over a period of 130 minutes. After all the catalyst stream was in, the reaction was allowed to continue for an additional 30 minutes at 125° C. Then the reaction mixture was stirred at 125° C. under a vacuum (0.13 mm Hg pressure) to remove the volatiles. The product had an amine eqivalent weight of 625, a Brookfield viscosity at 25° C. of 1250 cps, and contained 20 percent graft polymer.

EXAMPLE 2

To 77.6 grams of the product of Example 1 was added 20.0 grams of an epichlorohydrin/bisphenol A derived epoxy resin, having an epoxide equivalent weight of 174, and mixed thoroughly. After 24 hours at room temperature, the mixture was still liquid indicating a good "pot" life. A similar mixture cured at 150° C. for 18 hours formed an elastomeric mixture.

COMPARISON EXAMPLE A

To 57.48 grams of Polymer A was added 20 grams of an epichlorohydrin/bisphenol A derived epoxy resin having an epoxide equivalent of 174 and mixed thoroughly. The mixture was cured at 150° C. for 18 hours.

TABLE I

| Example | 2 | Comparison A |
|---|---|---|
| Physical Properties | | |
| Density | 65.4 | 61.2 |
| Tensile Strength, psi | 276 | 100 |
| Elongation, % | 63 | 30 |
| Shore "A" Hardness, Inst.-5 sec. | 48 | 42 |

The product of Example 2 had improved physical properties compared to the product of Comparison Example A.

EXAMPLE 3

The "backbone" polymer for this graft was Polymer B. This amine-terminated polymer was grafted at a 60 percent polymer level with acrylonitrile/styrene (3:1). The procedure is substantially identical to that found in Example 1. Changes in amounts or conditions are noted below:

| | 3 |
|---|---|
| Amine "backbone" polymer in pot, parts | 332.0 |
| Monomer stream | |
| Acrylonitrile, parts | 375.0 |
| Styrene, parts | 375.0 |
| 2,2'-Azo-bis(isobutyronitrile), parts | 15.0 |
| Amine "backbone" polymer in catalyst stream, parts | 168.0 |
| Reaction temperature, °C. | 115 |
| Monomer feed time, min. | 148 |
| Catalyst stream feed time, min. | 158 |

The resulting amine-terminated graft polymer was a syrup at the reaction temperature and an amber-colored, low melting solid at room temperature containing 60 percent graft polymer, equivalent weight 167.

EXAMPLE 4

To 47.89 grams of the product of Example 3 was added 50.0 grams of an epichlorohydrin/bisphenol A derived epoxy resin, having an epoxide equivalent weight of 174, and mixed thoroughly. After 24 hours at room temperature, the mixture was still liquid with only a slight increase in viscosity. A similar mixture cured at 110° C. for about one hour formed a brittle, clear and scratch resistant resin.

COMPARISON EXAMPLE B

To 20.0 grams of Polymer B was added 52.2 grams of the epoxy resin of Example 4 and mixed thoroughly. The mixture was cured at 110° C. for one hour.

TABLE III

| Example | 4 | Comparison B |
|---|---|---|
| Physical Properties | | |
| Density | 75.9 | 68.3 |
| Tensile strength, psi | 863 | 9180 |
| Elongation, % | <1 | 2 |
| Shore "D" hardness, Inst.-5 sec. | 69 | 71 |

Although the product of Example 4 has a significant loss of tensile strength, only nominal losses in elongation and Shore D hardness have occurred. This example illustrates the use of a large amount of inexpensive component (Product of Example 3) with lesser quantities of the more expensive epoxy compound.

The embodiments of the invention in which an exclusive privilege or property is claimed are defined as follows:

1. A curable composition which comprises (a) a polyepoxide compound and (b) a graft polymer dispersion prepared by the in situ polymerization in the presence of an effective amount of a free radical initiator, an ethylenically unsaturated monomer or mixture of monomers in an amine-terminated polyoxyalkylene polyether polymer.

2. The curable composition of claim 1 wherein the in situ polymerization is conducted at a temperature between 25° C. and 150° C.

3. The curable composition of claim 1 wherein the amount of monomer or mixture of monomers is between 1 to 75 parts per 100 parts of the dispersion product.

4. The curable composition of claim 1 wherein the amine-terminated polyoxyalkylenle polyether polymer has an equivalent weight of 50 to 2500.

5. The curable composition of claim 1 wherein the ethylenically unsaturated monomer is selected from the group consisting of styrene, acrylonitrile, vinylidene chloride, methyl methacrylate, acrylamide and mixtures thereof.

6. The curable composition of claim 1 wherein the ethylenically unsaturated monomer is a mixture of styrene and acrylonitrile.

7. The curable composition of claim 1 wherein the ethylenically unsaturated monomer is acrylonitrile.

8. The curable composition of claim 1 wherein the ethylenically unsaturated monomer is styrene.

9. The curable composition of claim 1 wherein the polyepoxide compound is selected from the group consisting of a diglycidyl ether of bisphenol A, a cycloaliphatic diepoxide, diglycidyl ether of resorcinol, polyglycidyl ethers of polyphenol derived from formaldehyde and phenol or cresol and polyglycidyl ethers of aliphatic polyhydroxy compounds.

* * * * *